F. L. & W. SPIESS.
BELT-STRETCHER.

No. 173,077. Patented Feb. 1, 1876.

UNITED STATES PATENT OFFICE.

FREDRICK L. SPIESS AND WILLIAM SPIESS, OF NEW YORK, N. Y.

IMPROVEMENT IN BELT-STRETCHERS.

Specification forming part of Letters Patent No. 173,077, dated February 1, 1876; application filed January 3, 1876.

*To all whom it may concern:*

Figure 1:
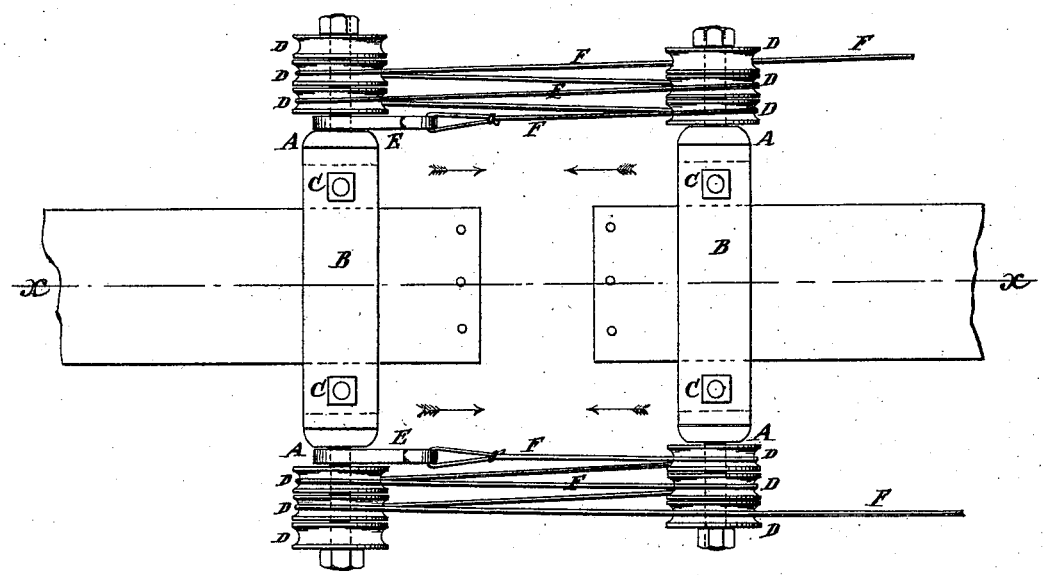
Figure 2:
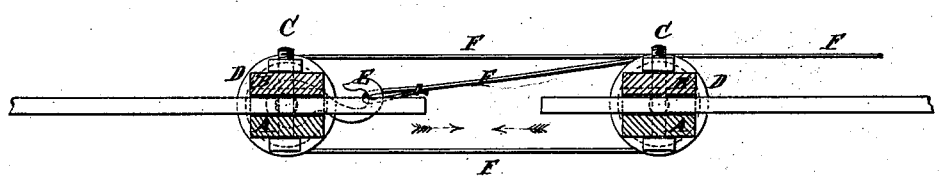

Be it known that we, FREDRICK L. SPIESS and WILLIAM SPIESS, of the city, county, and State of New York, have invented a new and Improved Belt-Stretcher, of which the following is a specification:

Figure 1 is a top view of our improved belt-stretcher, shown as applied to the ends of a belt; and Fig. 2 is a detail section of the same, taken through the line $x\ x$, Fig. 1.

Similar letters of reference indicate corresponding parts.

The object of this invention is to furnish an improved device by which belts may be stretched to any desired extent, and held securely while being laced, and which shall be simple in construction and convenient in use.

The invention consists in an improved belt-stretcher, formed by the combination of the two clamps, the loose pulleys, the hooks, and the cords with each other, as hereinafter fully described.

A B are two bars, one of which, as A, is made longer than the other, B, and has a recess formed in one side to receive the said bar B. The bars A B are held together, clamping the end of the belt between them, by the bolts C passing through them near the ends of the shorter bar B. Upon the ends of the longer bar A are formed journals, upon each end of which are placed two, three, or more loose pulleys, D, the number of pulleys depending upon the power to be applied to the belt. Two of these clamps are used, one being applied at each end of the belt. Upon the inner end of each of the journals of one of the clamps is placed the eye of a hook, E. F are two cords, upon one end of which is formed a loop to hook upon the hooks E, as shown in Figs. 1 and 2.

The cords F are then passed back and forth around the pulleys D, and by pulling upon the free ends of said cords F the clamps will be drawn toward each other, stretching the belt to any desired extent. By giving the free ends of the cords F another turn or two around the last pulleys, or by drawing the ends of said cords into the space between said pulleys, the belt will be held securely in place, and its ends can be laced or otherwise secured at leisure.

Having thus described our invention, we claim as new and desire to secure by Letters Patent—

The clamps A B C, provided with hooks, as shown, in combination with end pulleys, adapted to be operated by cords, substantially as and for the purpose specified.

FREDRICK L. SPIESS.
      WILLIAM SPIESS.

Witnesses:
 JAMES T. GRAHAM,
 T. B. MOSHER.